June 7, 1927.
E. R. KNIGHT
1,631,737
DYNAMO ELECTRIC MACHINE
Original Filed April 17, 1922
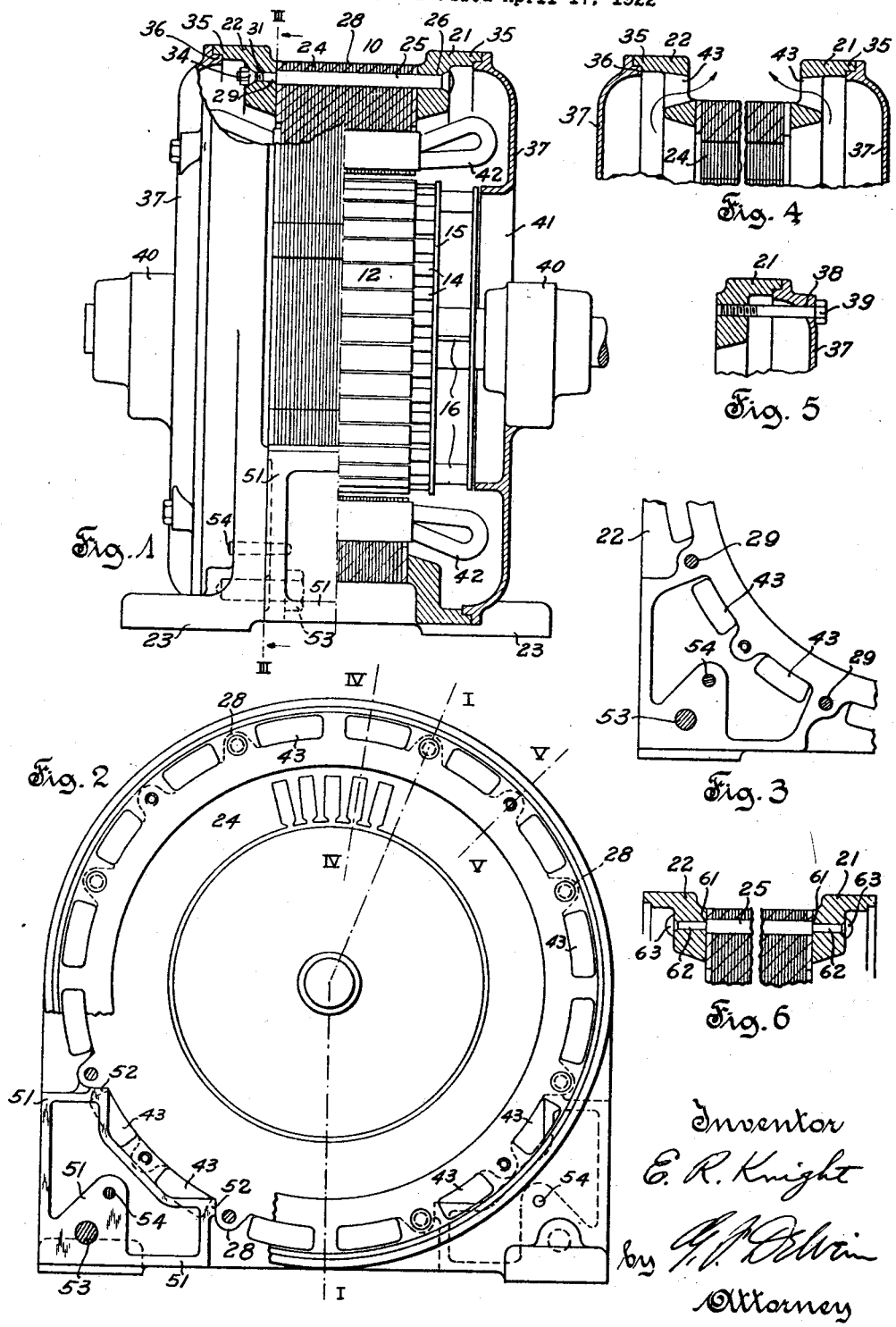

Patented June 7, 1927.

1,631,737

UNITED STATES PATENT OFFICE.

EARLE R. KNIGHT, OF NORWOOD, OHIO, ASSIGNOR TO ALLIS-CHALMERS MANUFACTURING COMPANY, OF MILWAUKEE, WISCONSIN, A CORPORATION OF DELAWARE.

DYNAMO-ELECTRIC MACHINE.

Application filed April 17, 1922, Serial No. 553,912. Renewed July 29, 1925.

This invention relates in general to dynamo-electric machine construction, and it has particular relation to the construction of the stator element of machines of this type, wherein a laminated core is held in assembled condition between end heads or plates without the necessity of the ordinary yoke surrounding the laminations.

The yokeless type of stator for dynamo-electric machines, especially for small motor construction, has decided advantages among which are decreased cost, arising especially from elimination of the surrounding yoke. Aside from the resulting decrease in weight, this elimination of the yoke insures flexibility as to the number of sizes or ratings of machines which can be constructed from the same stock parts and the patterns and dies therefor. This reduction in the number of parts and, consequently, the necessary patterns and dies therefor substantially reduces the investment involved in the manufacture and storage of the necessary patterns and dies for these parts, and the manufactured parts themselves.

The present invention includes improvements in the construction of the stator element of dynamo-electric machines, whereby the operations of assembling the machine are simplified, and the final construction is one in which maximum strength is provided and any tendency toward relative shifting of the constituent parts of the machine, especially the end heads and core laminations, is obviated, and most effective ventilation of the machine is secured through inherent characteristics of the design.

It is an object of this invention to provide an improved design and construction of dynamo-electric machines, wherein the core laminations are supported by and held in assembled condition between spaced end heads or plates.

It is a further object of this invention to provide an improved design and construction of dynamo-electric machines of the yokeless type, wherein the core laminations of the stator are supported by and held in assembled condition between the end heads and the latter are of such inherent design as to facilitate effective ventilation of the machine.

It is a further object of this invention to provide an improved design and construction of dynamo-electric machines embodying a stator of the yokeless type, wherein the stator core laminations are supported by and held in assembled condition between end heads, and additional means in the form of spacing and bracing devices, are utilized for providing increased strength of the assembled stator with minimum cost of construction.

These and other objects and advantages are attained by this invention, the various novel features of which will be apparent from the description and drawings, disclosing an embodiment of the invention, and will be more particularly pointed out in the claims.

In the accompanying drawings:

Fig. 1 is a front elevation, partly in section, of a dynamo-electric machine embodying features of the present invention, the plane of section of the right-hand half of the machine being that of the line I—I of Fig. 2.

Fig. 2 is a right-hand end elevation of the machine shown in Fig. 1, with the end bell removed and certain parts broken away, as indicated, and the stator winding being omitted and the rotor shown only in conventional outline.

Fig. 3 is a broken sectional view along the plane of the line III—III of Fig. 1.

Fig. 4 is a broken sectional view along the plane of the line IV—IV of Fig. 2.

Fig. 5 is a broken sectional view along the plane of the line V—V of Fig. 2.

Fig. 6 is a broken sectional view of an alternative form of a detail of construction.

The dynamo-electric machine disclosed in the drawings, here shown as an alternating current motor of the squirrel-cage type, includes a stator 10 and a rotor 12 mounted for rotation within the stator. The slots of the rotor core are provided with conducting bars 14 which project beyond the ends of the core and are there secured to end connecting rings 15. A ventilating fan 16 is mounted upon the outer side of each of the end rings 15, the purpose of these fans being to draw currents of ventilating air into the machine in an axial direction and to force these air currents radially outward across the stator winding to cool the same.

The stator 10 comprises a frame consisting essentially of the end heads 21 and 22, preferably of cast steel, and having its radially extending body portion provided with integral feet 23 adapted for supporting the machine on a base, slide rail, etc. Core laminæ 24 are held in assembled condition between the radially extending portions of the end heads by means of bolts 25 passing through apertures 26 in the end head 21, each bolt having a shouldered head fitting in a correspondingly shaped counter-bored portion of the aperture 26. These bolts 25 pass through alined apertures in enlargements or lugs 28 at the outer periphery of the core laminations. The other end of each of the bolts 25 may be reduced to form a shoulder, as indicated at 29, which fits against the inner side of the end head 22, the reduced portion of the bolt passing through an aperture 31 in this end head, and the outer end of this aperture being tapered to receive the inner portion of a correspondingly tapered locking or other type of nut 34 threaded on the end of the bolt. The bolts 25 with their co-operating nuts 34 serve to hold the end head 22, drawn up against the shoulders 29 on the bolts 25, the arrangement being such as serves to limit both the mutual approach and separation of the end heads, the bolts thus acting to maintain the end heads parallel and a definite distance apart with the core laminations securely clamped in position, and presenting a substantially smooth and unobstructed exterior surface at the recessed portions between adjacent enlargements, thus offering a minimum impediment to movement of ventilating currents axially across this surface. The radial thickness of the stator core or its magnetic path, except at the enlargements 28, is only such as is required to produce efficient operation of the machine without undue heating, and the enlargements 28 are preferably only of such size as to constitute the required mechanical bearing for the laminæ clamping means, with the apertures therethrough wholly or substantially outside of the normal magnetic path through the core. With this arrangement, the required mechanical strength and electrical efficiency of the machine are secured with minimum weight of core material.

Each of the end heads 21 and 22 is provided with an axial extension 35 at its outer periphery, the radially inner side of each of these extensions being provided with a shouldered recess 36 which is machined to receive a correspondingly machined portion at the outer periphery of an end bell or housing 37. Each end bell is provided with spaced through apertures 38 near its edge to receive bolts or cap screws 39, here shown as four in number and spaced apart the same distance so as to provide for interchangeable fitting of the end bell in position. These cap screws 39 are threaded into correspondingly spaced and threaded apertures in the end heads 21 and 22 intermediate the apertures in which the bolts 29 are disposed, and thus serve to hold the end bell in operative position, the preferable arrangement being as indicated in the drawings, wherein the bolts 39 cooperate with portions of the end heads which are in substantially circumferential alinement with those portions of the end heads with which the clamping bolts 25 cooperate.

Bearing housings 40 are preferably cast integral with the end bells, apertures 41 being provided through the end bells adjacent the bearing housings and serving to permit the passage of ventilating air currents to the interior of the machine.

The stator 10 is provided with a winding 42 disposed in slots of the core and having its projecting end portions extending well into the end bells and being generally in radial alinement with the fans 16 on the rotor.

Each of the end heads 21 and 22 is provided with a plurality of spaced apertures 43 near its outer periphery and intermediate the enlargements or lugs 28 carrying the holding bolts or rivets 25 and the bolts 39 for holding the end bells in position, these apertures being in substantially circumferential alinement with the core enlargements 28 and the clamping bolts 29 and providing communication between the space within the end bell, in the vicinity of the end turns of the winding 42, and the exterior of the core, as indicated in Fig. 4. The construction is such that, in operation, air is drawn axially inward by the fans 16 through the apertures 41 in the end bells, and is blown radially outward around the end turns of the winding 32, the heated air passing outward through the apertures 43. The heated air is discharged across the exterior of the laminations in a direction substantially parallel to the shaft, this method of discharge eliminating the possibility of dust and dirt dropping into the air passages and retarding the ventilation of the machine.

As a further means for holding the end heads parallel and solid, especially at points adjacent the feet on the end heads, and consequently assisting in holding the feet and end heads in alinement, there are provided saddle-shaped bracing and spacing blocks 51 between the lower portions of the end heads, one of these blocks being between each pair of feet. Each block is machined at its sides, machined edges and pads being indicated, so as to have a close fit between correspondingly machined portions at the inner sides of the end heads 21 and 22. The block is preferably hollow or of skeleton construction, so as to provide the required rigidity with a minimum of weight, and it is formed with substantially right-angled shoulders 52 so spaced and machined as to fit snugly between and against adjacent lugs or enlargements 28 at the exterior of the assembled core laminations. Each of these blocks 51 is forced into operative position with its shoulders 52 between and against adjacent core enlargements 28, and is held in such position by means of bolts or cap screws 53, occupying alined apertures in the block and the end heads 21 and 22 and adjustable through the open lower side of the block, and by tapered dowels 54 which are forced into alined apertures in the block and in the end heads. With the blocks held in this position, all the parts of the stator are firmly secured in operative position.

In Fig. 6 there is shown a modification of the means for holding the core laminations in assembled condition between the end heads 21 and 22. The bolt 25 is provided with a shoulder 61 adjacent each end, the reduced end portions 62 passing through alined apertures in the end heads. The parts are held in assembled condition with the core laminae between the end heads and the end heads against the shoulders 61 on the bolts by riveting over the ends of the bolts against the outer sides of the end heads, as indicated at 63. It will be apparent that this specific construction also provides for the desired bracing and spacing of the end heads, as determined by the distance between the shoulders 61 on the bolts.

In assembling the stator of the machine, the core laminations are assembled on a mandrel and, while subjected to hydraulic or other pressure, are clamped and bolted or riveted together between the end heads 21 and 22; or the end heads may be drawn into and held in assembled condition with respect to the core laminations on the mandrel through the co-operation of the heads and shoulders on the bolts and the holding nuts. If desired, the nuts 34 and the ends of the bolts may be riveted over together against the outer side of the end head 22. While the cores are still on the mandrel, the saddle blocks 51 are forced into place between the end heads and are secured therein by the dowels 54 and the bolts 53. The machined fitting for the bearing housing or end bell may be turned on the end heads while the latter are held on the mandrel, thus insuring that the stator core will be concentric with the rotor.

It will be apparent that an exceedingly simple and effective design of dynamo-electric machine, is disclosed in the description hereinabove, and that this design is flexible to the extent of providing different sizes or ratings of machines with the minimum expenditure for patterns and dies and the minimum requirements as to stock parts; and it will be apparent further that this machine may be assembled in a manner that greatly facilitates and reduces the cost of the assembling operation. Further, a motor of satisfactory and particularly desirable operating characteristics and mechanical design especially as to strength is produced with a minimum weight of material and, hence, at a minimum expense for materials.

The manner of assembling and machining the stator is more particularly described and claimed in applicant's copending application Serial No. 20,935, filed April 6, 1925, the latter application constituting a division of the present application.

It should be understood that it is not desired that the invention claimed be limited to the exact details of construction shown and described, for obvious modifications may occur to one skilled in the art.

It is claimed and desired to secure by Letters Patent:

1. In a dynamo-electric machine, a stator comprising in combination separately formed and spaced end heads, a core consisting of assembled laminae having spaced and apertured enlargements at the periphery, said peripheral enlargements of the laminae being transversely alined to provide therebetween substantially unobstructed recesses extending across the core at the periphery thereof, and means associated with said end heads and passing through the enlargements on said core for clamping and holding said laminae in assembled condition between said end heads with the latter bearing against the outer ones of said laminae over an annular surface of engagement and for holding said end heads in spaced operative relation, said end heads extending radially beyond said assembled laminae at points intermediate said enlargements and provided with through apertures affording ventilating passages substantially unobstructed by said laminae.

2. In a dynamo-electric machine, a stator comprising in combination separately formed and spaced end heads, a core consisting of assembled laminae having spaced enlargements at the periphery, securing devices associated with said end heads and passing through the enlargements of said core and operative to clamp and hold said laminae in assembled condition between said end heads, and spacing devices secured in position between said end heads and in operative relation to peripheral portions of said enlargements on the core.

3. In a dynamo-electric machine, a stator comprising in combination separately formed and spaced end heads, a core of assembled laminae having spaced enlargements at the periphery, securing devices associated with said end heads and passing through said core for clamping and holding said laminae in assembled condition between said end heads, and spacing blocks secured in position between said end heads adjacent the bases thereof; said spacing blocks having shouldered portions fitting between and in engagement with adjacent enlargements on said core.

4. In a dynamo-electric machine, a stator comprising separately formed and spaced end heads adapted to support the stator when in assembled condition, a core of assembled laminæ, and means for holding said laminæ assembled in operative condition between and supporting said laminæ on said end heads, and end bells disposed outside of said end heads and attached thereto adjacent the outer periphery, said end heads being provided with through apertures adjacent the periphery, portions of said apertures being unobstructed by said core laminæ and substantially circumferentially alined with the means for holding said laminæ assembled and opening axially into the space outside of said laminated core and providing communication with the space within said end bells.

5. In a dynamo-electric machine, a stator comprising separately formed and spaced end heads adapted to carry the weight of the stator when in assembled condition, a core of assembled laminæ having spaced enlargements at the outer periphery, unitary devices associated with said end heads and the peripheral enlargements of said core for clamping and holding said laminæ in assembled condition between said end heads, and spacing blocks secured in position between said end heads and having spaced portions operatively associated with adjacent enlargements on said core for holding said parts against relative displacement.

6. In a dynamo-electric machine, a stator comprising separately formed and spaced end heads adapted to support the stator when in assembled condition, a core of assembled laminæ having spaced enlargements at the outer periphery, securing devices associated with said end heads and the enlargements on said core for clamping and holding said laminæ in assembled condition between and supporting said laminæ on said end heads, and spacing blocks secured in position between said end heads adjacent the bases thereof and having spaced portions fitting between and co-operative with adjacent enlargements on said core for holding the associated parts against displacement.

7. In a dynamo-electric machine, a stator comprising separately formed and spaced end heads adapted to support the stator when in assembled condition, each of said end heads comprising an annular radially extending plate portion, a core of assembled laminæ having spaced enlargements at the outer periphery, securing devices associated with peripheral portions of said annular plates of said end heads and passing through apertures in the enlargements on said core for clamping and holding said laminæ in assembled condition between said end heads, and end bells disposed in operative position outside of said end heads and secured thereto at spaced peripheral points, said annular plates of said end heads being provided adjacent the periphery thereof with spaced, substantially axially extending apertures substantially circumferentially alined with said laminæ-clamping means and disposed intermediate adjacent peripheral enlargements of the core and adapted to provide communication between the space within said end bell and the exterior of said laminated core.

8. In a dynamo-electric machine, a stator comprising separately formed and spaced end heads, a core of assembled laminæ having spaced enlargements at the outer periphery, securing devices associated with said end heads and passing through apertures in the enlargements on said core for clamping and holding said laminæ in assembled condition between said end heads and for holding said end heads in spaced operative relation, end bells disposed in operative position axially outside of said end heads and secured thereto at spaced peripheral points, said end heads being provided adjacent the periphery thereof with spaced, substantially axially extending apertures disposed intermediate adjacent peripheral enlargements on said core and adapted to provide communication between the space within said end bells and the exterior of said core, and spacing blocks secured in position between said end heads adjacent their bases, said blocks having spaced shouldered portions fitting between and co-operative with adjacent enlargements on said laminated core and adapted to hold the associated parts against displacement.

9. In a dynamo-electric machine, a stator comprising separately formed and spaced end heads adapted to support the stator when in assembled condition, a core consisting of assembled laminæ, means associated with said laminæ and said end heads for clamping and holding said laminæ in assembled condition between said end heads, and additional means cooperative with external portions of said laminæ and said end heads for holding said end heads in spaced relation and for maintaining said laminæ against relative displacement.

10. In a dynamo-electric machine, a stator comprising in combination separately formed and spaced end heads, a core of assembled laminæ, securing devices associated with said end heads and said laminæ for clamping and holding said laminæ in assembled condition between said end heads, and means secured in position between said end heads adjacent the base thereof and having portions cooperative with spaced, peripheral, shouldered portions of said core for maintaining said end heads in spaced operative relation and securing said laminæ in position relative to each other.

11. In a dynamo-electric machine, a stator comprising separately formed and spaced end heads adapted to support the stator when in assembled condition, a core of assembled laminæ having spaced enlargements at the outer periphery thereof providing transverse and substantially unobstructed recesses across the peripheral face of said core, and means associated with the enlargements on said laminæ and with radially extending portions of said end heads and operative to draw said end heads together and to compact said laminæ therebetween and to secure said laminæ in assembled condition between said end heads, peripheral portions of said end heads between the enlargements on said laminæ being provided with through ventilating passages communicating with said recesses formed at the periphery of said laminæ.

12. In a dynamo-electric machine, a stator comprising in combination separately formed and spaced end heads adapted to support the stator when in assembled condition, a core consisting of assembled laminæ each having spaced and apertured enlargements at the outer periphery thereof providing transverse and substantially unobstructed peripheral recesses therebetween, securing means passing through said perforated enlargements and effective to secure said laminæ in assembled condition between said end heads, and end bells secured to said end heads and operatively supported at peripheral portions thereof, portions of said end heads intermediate the peripheral enlargements on said laminæ being provided with apertures opening into the spaces within said end bells whereby substantially unobstructed ventilating passages are provided from the spaces within said end bells and through the apertures in said end heads and across the outer periphery of the core.

13. In a dynamo-electric machine, a stator element comprising in combination, separately formed and spaced end heads each having an annular radially extending portion and individual integral supporting feet adapted to carry the weight of the stator, a core consisting of assembled laminæ having spaced and apertured enlargements at the outer periphery thereof, said peripheral enlargements of the laminæ being transversely alined and providing therebetween substantially unobstructed peripheral surface portions extending across the core, and means associated with said end heads and passing through the enlargements on said core for clamping and holding said laminæ in assembled condition with said annular radially extending portions of the end heads bearing against and confining said laminæ, said clamping means cooperating with said laminæ to hold said end heads in spaced operative relation, said end heads extending radially beyond said assembled laminæ at points intermediate said enlargements and provided with through apertures affording ventilating passages substantially unobstructed by said laminæ.

14. In a dynamo-electric machine, a stator comprising separately formed and spaced end heads, means integrally associated with said end heads for supporting said stator in operative position, a core of assembled laminæ having spaced and apertured enlargements at the outer periphery thereof, and means associated with said apertured enlargements for holding said laminæ assembled in operative condition between and supporting said laminæ on said end heads, said end heads being provided with through recesses adjacent the periphery thereof intermediate the enlargements on said core, portions of said recesses being unobstructed by said core laminæ and the unobstructed portions of said recesses being substantially circumferentially alined with the means for holding said laminæ assembled, and end bells disposed axially outside of and attached to said end heads and supported thereon at peripheral portions of said end heads radially outside of said recesses therein and said recesses in the end heads opening axially into the space outside of said laminated core and providing communication with the space within said end bells.

15. In a dynamo-electric machine, a stator comprising separately formed and spaced end heads and supporting feet rigidly associated therewith and adapted to support said stator in operative position, a core of assembled laminæ having spaced enlargements at the outer periphery thereof and providing an exterior surface of substantially smooth and unobstructed contour therebetween, securing devices associated with said end heads and the enlargements on said core for clamping and holding said laminæ in alined and assembled condition between said end heads, and end bells supported in operative position axially outside of said end heads and secured thereto at spaced peripheral points thereof, said end heads being provided adjacent the periphery thereof with spaced, substantially axially extending apertures substantially circumferentially alined with said laminæ-clamping means and disposed intermediate adjacent peripheral enlargements of the core and adapted to provide communication between the space within said end bells and the exterior of said laminated core.

16. In a dynamo-electric machine, a stator comprising separately formed and spaced end heads adapted when in assembled condition to support said machine, a core of assembled laminæ disposed between annular radially extending portions of said end heads and having spaced enlargements at the outer periphery providing transverse and substantially unobstructed recesses therebetween across the peripheral face of said core, means associated with said end heads and the enlargements on said laminæ for securing the latter in assembled condition between said radially extending portions of the end heads, and end bells carrying bearing housings for the rotor of the machine secured to and supported on peripheral portions of said end heads, peripheral portions of said end heads between said enlargements on said laminæ being provided with through ventilating passages communicating with the spaces within said end bells and said recesses formed at the periphery of said core laminæ.

17. In a dynamo-electric machine, a stator comprising in combination, separately formed and spaced end heads each provided with a supporting portion through which said end heads when in assembled condition are adapted to support the machine, a core consisting of assembled laminæ having at their outer periphery spaced and apertured enlargements providing transverse and substantially unobstructed peripheral recesses therebetween, securing means passing through the perforations in said enlargements and effective to aline said laminæ and to secure said laminæ in assembled condition between radially extending portions of said end heads, end bells disposed axially outside of said end heads, and means for securing said end bells to and supporting the same in operative position on said end heads, said securing means cooperating with said radially extending portions of the end heads and being in substantially circumferential alinement with said laminæ securing means, portions of said end heads intermediate the peripheral enlargements on said laminæ being provided with apertures opening into the spaces within said end bells whereby substantially unobstructed ventilating passages are provided from the spaces within said end bells and through the apertures in said end heads and across the outer periphery of the core.

In testimony whereof, the signature of the inventor is affixed hereto.

EARLE R. KNIGHT